United States Patent
Kang et al.

(10) Patent No.: US 6,746,359 B2
(45) Date of Patent: Jun. 8, 2004

(54) SHIFT CONTROL METHOD FOR AN AUTOMATIC TRANSMISSION

(75) Inventors: Myoung-Hun Kang, Yongin (KR); Jae-Duk Jang, Yongin (KR); Hyu-Tae Shim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/321,069

(22) Filed: Dec. 16, 2002

(65) Prior Publication Data

US 2003/0125156 A1 Jul. 3, 2003

(30) Foreign Application Priority Data

Dec. 27, 2001 (KR) ........................ 2001-85558

(51) Int. Cl.[7] .................. F16H 3/62; F16H 61/40
(52) U.S. Cl. ................. 475/276; 475/118; 475/121; 475/281; 475/292; 477/69; 477/75
(58) Field of Search ................ 475/276, 59, 118, 475/121, 280, 281, 282, 283, 284, 285, 286, 287, 292, 293, 296, 297; 477/53, 69, 68, 74, 75

(56) References Cited

U.S. PATENT DOCUMENTS

| | | | | |
|---|---|---|---|---|
| 5,431,604 A | * | 7/1995 | Marusue et al. | 475/123 |
| 5,569,116 A | * | 10/1996 | Jang | 477/130 |
| 5,697,864 A | * | 12/1997 | Watanabe | 477/98 |
| 5,720,694 A | * | 2/1998 | Jang | 477/116 |
| 6,071,208 A | * | 6/2000 | Koivunen | 475/275 |
| 6,217,474 B1 | * | 4/2001 | Ross et al. | 475/269 |
| 6,270,444 B1 | * | 8/2001 | Tsutsui et al. | 477/143 |

* cited by examiner

Primary Examiner—Tisha D Lewis
(74) Attorney, Agent, or Firm—Morgan Lewis & Bockius LLP

(57) ABSTRACT

A primary shift portion has a first predetermined speed ratio at a first shift-speed, a second predetermined speed ratio at a second shift-speed, a speed ratio of "1" at third and fifth shift-speeds, and a third predetermined speed ratio at fourth and sixth shift-speeds. A secondary shift portion has a predetermined reduction speed ratio at first, second, third, and fourth shift-speeds, and a speed ratio of "1" at fifth and sixth shift-speeds. The method realizes a 6-speed automatic transmission being capable of sequentially up- and down-shifting and a plurality of skip shifts with an existing 5-speed automatic transmission.

20 Claims, 2 Drawing Sheets

| engaging element | clutch | | | | brake | | | F1 | F2 |
|---|---|---|---|---|---|---|---|---|---|
| | C1 | C2 | C3 | C4 | B1 | B2 | B3 | | |
| shift range 1st | ● | | | | ● | | ○ | ○ | ● |
| 2nd | ● | | | | | ● | ○ | | ● |
| 3rd | ● | ● | | | | | ● | | ○ |
| 4th | | ● | | | | ● | ● | | ○ |
| 5th | ● | ● | | ● | | | | | |
| 6th | | ● | | ● | | ● | | | |
| N,P | | | | | ● | | ● | | ○ |
| R | | | ● | | ● | | ● | | ○ | ns to a shift control method for
SHIFT CONTROL METHOD FOR AN AUTOMATIC TRANSMISSION

FIELD OF THE INVENTION

The present invention relates to a shift control method for an automatic transmission. More particularly, the present invention relates to a 6-speed shift control method for an automatic transmission to improve power performance and fuel economy by obtaining 6-speeds from an existing 5-speed automatic transmission.

BACKGROUND OF THE INVENTION

Presently, 4-speed and 5-speed automatic transmissions are commonly used in vehicles. Such automatic transmissions are developed differently by vehicle makers depending on the type of vehicle.

However, current shift control methods have a number of drawbacks. For example, it is difficult to improve power performance and fuel economy in prior shift control methods. Furthermore, customer requirements for more speeds have not yet been satisfied.

SUMMARY OF THE INVENTION

The present invention provides a shift control method that provides six forward speeds with an existing 5-speed automatic transmission. Control of shifting is easier, power performance and fuel economy with optimal gear ratios are improved, shift quality is improved such that shift shock is minimized, and the weight of an automatic transmission is decreased.

Consequently, the present invention provides a shift control method of an automatic transmission, the automatic transmission includes a primary shift portion including two single pinion planetary gear sets, three clutches, two brakes, and a first one-way clutch. The automatic transmission also includes a secondary shift portion including a single pinion planetary gear set, a fourth clutch, a third brake, and a second one-way clutch.

In use, the automatic transmission is controlled at a first shift-speed, such that the primary shift portion has a first predetermined speed ratio and the secondary shift portion has a predetermined reduction ratio. The automatic transmission is then controlled at a second shift-speed such that the primary shift portion has a second predetermined speed ratio and the secondary shift portion has said predetermined reduction ratio. The automatic transmission is also controlled at a third shift-speed such that the primary shift portion has a speed ratio of "1" and the secondary shift portion has said predetermined reduction ratio. The automatic transmission is controlled at a fourth shift-speed such that the primary shift portion has a third predetermined speed ratio and the secondary shift portion has said predetermined reduction ratio. Additionally, the automatic transmission is controlled at a fifth shift-speed such that the primary shift portion has a speed ratio of "1" and the secondary shift portion has a speed ratio of "1". Finally, the automatic transmission is controlled at a sixth shift-speed such that the primary shift portion has said third predetermined speed ratio and the secondary shift portion has a speed ratio of "1".

BRIEF DESCRIPTION OF THE DRAWINGS

Preferred embodiments of the present invention will be described in detail below while referring to the attached figures. Like reference numerals refer to corresponding parts throughout the several views of the drawings.

DETAILED DESCRIPTION OF THE PREFERRED EMBODIMENTS

Figure 1:
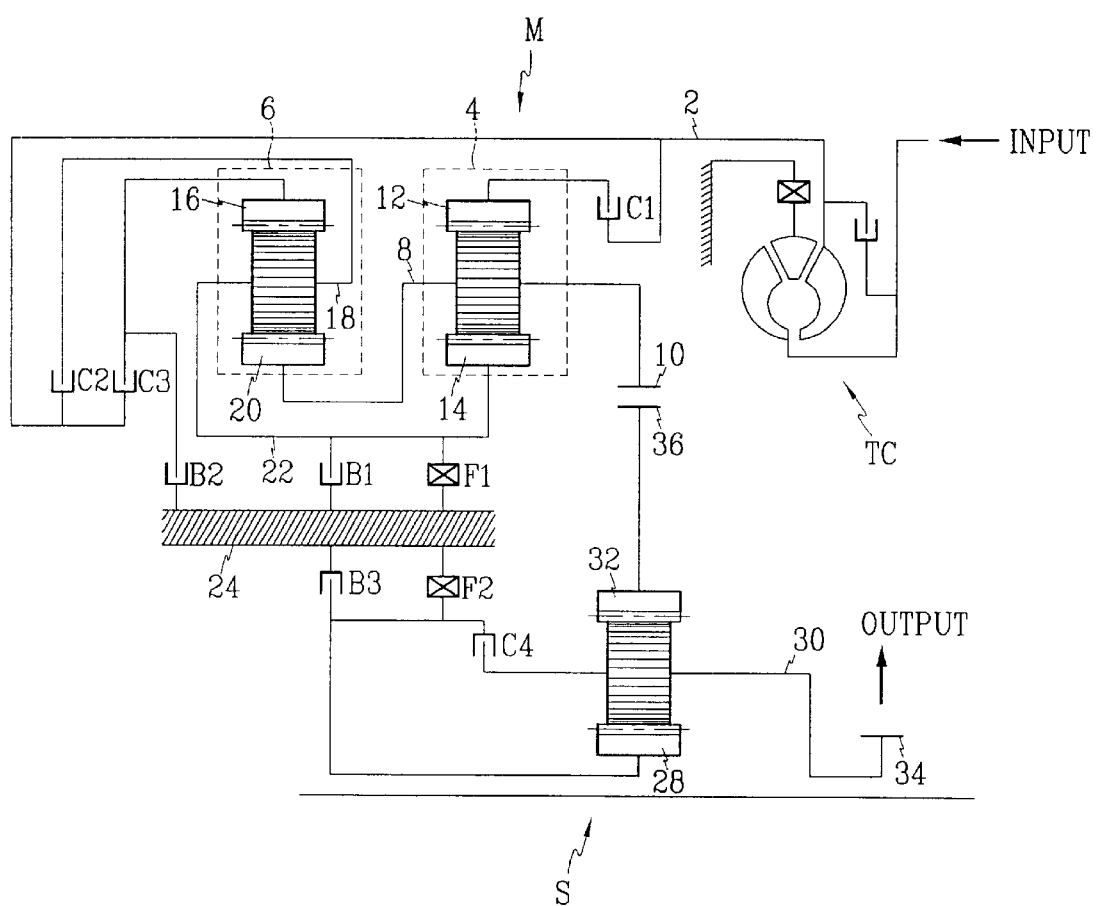
FIG. 1 is a schematic diagram of an automatic transmission to which a preferred embodiment of the present invention is applied.

FIG. 1 is a schematic diagram of a 5-speed automatic transmission to which the present invention is applied. Reference numerals of parts in subsequent figures will refer to the same of FIG. 1, which have been explained above.

The 5-speed automatic transmission is composed of a primary shift portion M including two single pinion planetary gear sets 4 and 6, and a secondary shift portion S including a single pinion planetary gear set. The primary shift portion M receives power from a turbine of a torque converter through an input shaft 2. The primary shift portion subsequently transmits torque to first and second single pinion planetary gear sets 4 and 6. Power is then transmitted to the secondary shift portion S through a transfer drive gear 10 connected with a planetary carrier 8 of the first single pinion planetary gear set 4.

A first planetary carrier 8 and a second ring gear 20 of the primary shift portion M are fixedly connected as an output element of the primary shift portion. A first ring gear 14 and a second planetary carrier 18 are fixedly connected to each other. A first sun gear 12, the second planetary carrier 18 and a second sun gear 16 are variably connected to the input shaft 2 by interposition of a first clutch C1, a second clutch C2, and a third clutch C3, respectively. Therefore, the primary shift portion has three input elements.

A connecting-member 22 which connects the first ring gear 14 and the second planetary carrier 18 is variably fixed to a housing 24 through a first brake B1 and a first one-way clutch F1. The second sun gear 16 is variably fixed to the housing 24 through a second brake B2. Therefore, the primary shift portion has two fixed elements.

A third ring gear 32 of the secondary shift portion S is an input element of the secondary shift portion. A third planetary carrier 30 is an output element of the secondary shift portion. A third sun gear 28 and the third planetary carrier 30 are connected by interposition of a fourth clutch C4. The third sun gear 28 is connected to the housing 24 through a third brake B3 and a second one-way clutch F2.

Accordingly, the above automatic transmission can develop five forward speeds and one reverse speed by engaging the first clutch C1 and the third brake B3 at a first speed; the first clutch C1, the second brake B2, and the third brake B3 at a second speed; the first clutch C1, the second clutch C2, and the third brake B3 at a third speed; the second clutch C2 and the second brake B2 at a fourth speed; the second clutch C2, the fourth clutch C4, and the second brake B2 at a fifth speed; and the third clutch C3, the first brake B1, and the third brake B3 at a reverse speed.

Figures 2, 3:
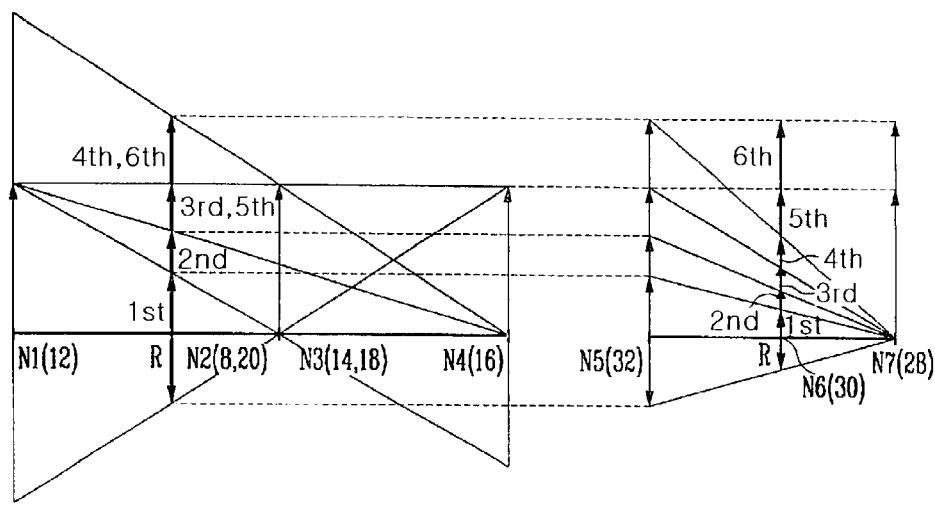
FIG. 2 is a lever diagram showing the process of shifting according to a preferred embodiment of the present invention.
FIG. 3 is an operational chart showing friction elements engaged at each shift-speed according to a preferred embodiment of the present invention.

FIGS. 2 and 3 are an alignment chart and a friction element engagement table, respectively, to describe the process of shifting according to the present invention. Referring to FIG. 2, in the primary shift portion, a first node N1 of a lever is set as the first sun gear 12, a second node N2 as the first planetary carrier 8 and the second ring gear 20, a third node N3 as the first ring gear 14 and the second planetary carrier 18, and a fourth node N4 as the second sun gear 16. The first planetary carrier 8 and the second ring gear are fixedly connected, and the first ring gear 14 and the second planetary carrier 18 are fixedly connected.

In a secondary shift portion, a fifth node N5 of the lever is set as the third ring gear 32, a sixth node N6 as the third planetary carrier 30, and a seventh node N7 as the third sun gear 28. The above node-setting method is well known by those skilled in the art.

First, the first brake B1 and the third brake B3 are engaged in N and P ranges. When a driver changes a gear select lever into drive (D range) to drive a vehicle, a transmission control unit (TCU) engages the first clutch C1 and the first brake B1. When the first clutch C1 is engaged, power from the vehicle's engine is inputted through the first sun gear 12, and the first ring gear 14 and the second planetary carrier 18 operate as a fixed element by engaging the first brake B1. Therefore, a first speed in the primary shift portion is outputted through the second node N2, while the first node N1 operates as an input element and the third node N3 operates as a fixed element.

The output of the primary shift portion is inputted into the third ring gear 32 of the secondary shift portion through a transfer drive gear, and the third sun gear 28 operates as a fixed element by operation of the second one-way clutch F2. Therefore, a first speed in the secondary shift portion is outputted through the sixth node N6 to be finally reduced, while the fifth node N5 operates as an input element and the seventh node N7 operates as a fixed element.

When a vehicle speed is increased in the first speed state, the TCU disengages the first brake B1 and engages the second brake B2. Then, in the primary shift portion M, the fixed element is converted from the third node N3 to the fourth node N4, and the secondary shift portion has no change. Therefore, a second speed having a lower speed ratio than a first speed ratio is outputted.

When a vehicle speed is increased in the second speed state, the TCU disengages the second brake B2 to be disengaged, and engages the second clutch C2 and the third brake B3. Then, because power from the engine is transmitted through the first clutch C1 and the second clutch C2, the output speed ratio of the primary shift portion becomes 1. Also, because the third brake B3 functions as the second one-way clutch F2, the secondary shift portion has the same reduction ratio as the first and second speeds, and a third speed is finally outputted.

When a vehicle speed is increased in the third speed state, the TCU disengages the first clutch C1 and engages the second brake B2. Then, in the primary shift portion, because the third node N3 operates as an input element and the fourth node N4 operates as a fixed element, overdrive occurs. Also, because the secondary shift portion has no change, a fourth speed is finally outputted.

When a vehicle speed is increased in the fourth speed state, the TCU disengages both the second brake B2 and the third brake B3, and engages the first clutch C1 and the fourth clutch C4. Then, the output speed ratio of the primary shift portion becomes 1 as in the third speed, the speed ratio of the secondary shift portion becomes 1 by engaging the fourth clutch C4. Therefore, a fifth speed is outputted wherein the overall speed ratio is 1.

When a vehicle speed is increased in the fifth speed state, the TCU disengages the first clutch C1 and engages the second brake B2. Then, overdrive occurs in the primary shift portion as in the fourth speed, the secondary shift portion outputs a speed ratio of "1" as in the fifth speed. Therefore, a sixth speed having the lowest speed ratio is outputted.

When a driver changes a select lever into R range to back-up the vehicle, the TCU engages the third clutch C3, the first brake B1, and the third brake B3. Then, in the primary shift portion, the fourth node N4 operates as an input element and the third node N3 operates as a fixed element, and in the secondary shift portion, the fifth node N5 operates as an input element and the seventh node N7 operates as a fixed element. Additionally, a reverse output occurs in the primary shift portion, it is reduced in the secondary shift portion, and reverse shifting is finally completed.

It is described in FIG. 2 that the revolution direction of the primary shift portion is the same as the revolution direction of the secondary shift portion, but the directions are actually opposite each other in the case that the transfer drive gear 10 is directly engaged with the transfer driven gear 36. Both directions are the same in the case in which an idle gear or a chain is located between the two gears.

The above shift relation may be shown in the following table.

TABLE 1

| Shift Range | | Primary Shift Portion | Secondary Shift Portion |
|---|---|---|---|
| D (Forward) | 1 | Reduction | Reduction |
| | 2 | Reduction | Reduction |
| | 3 | Speed Ratio of "1" | Reduction |
| | 4 | Overdrive | Reduction |
| | 5 | Speed Ratio of "1" (same as 3rd) | Speed Ratio of "1" |
| | 6 | Overdrive (same as 4th) | Speed Ratio of "1" |
| R (Reverse) | | Reduction | Reduction |

The automatic transmission to which the present invention is applied is capable of skip shifting 3→1, 4→2, 5→3, 5→2, 6→4, and 6→3. This shifting can be achieved by directly controlling the engagement of friction elements of a target shift range in a current shift range during skip shifting.

Furthermore, 6→3 skip-shift control may be accomplished by passing through a fourth speed. Skip shifting directly from a sixth speed to a third speed is not easy to control because three elements have to be simultaneously disengaged or engaged. Therefore, by passing through a fourth speed shifting process, that is, by disengaging one element C4, then by successively disengaging one element B2 and engaging one element C1, shift quality may be improved. Fundamentally the same as in the above, skip-shift control may be also accomplished by passing through a third speed during 5→2 shifting.

In FIG. 3, "O" in the brake and one-way clutch columns indicates that the elements can be alternatively engaged or disengaged. This is because the first one-way clutch F1 can function as the first brake B1 when it is operated, and the second one-way clutch F2 can function as the third brake B3 when it is operated.

The skip-shifting processes are as follows.

To achieve 3→1 shifting, the TCU disengages the second clutch C2 and the third brake B3 (at the third speed wherein the first clutch C1, the second clutch C2, and the third brake B3 are engaged). At this time, control of the first brake B1 is unnecessary because of the operation of the first one-way clutch F1.

To achieve 4→2 shifting, the TCU disengages the second clutch C2 and engages the first clutch C1 (at the fourth speed wherein the second clutch C2, the second brake B2, and the third brake B3 are engaged).

To achieve 5→3 shifting, the TCU disengages the fourth clutch C4 (at the fifth speed wherein the first clutch C1, the second clutch C2, and the fourth clutch C4 are engaged). At this time, control of the third brake B3 is unnecessary because of the operation of the second one-way clutch F2.

To achieve 5→2 shifting, the TCU disengages the second clutch C2 and the fourth clutch C4 and engages the second brake B2 (at the fifth speed wherein the first clutch C1, the second clutch C2, and the fourth clutch C4 are engaged). At this time, control of the third brake B3 is unnecessary because of the operation of the second one-way clutch F2.

To achieve 5→2 shifting, as in the other method, after shifting into a third speed by disengaging the fourth clutch C4, the TCU disengages the second clutch C2 and engages the second brake B2. Control of the third brake B3 is unnecessary because of the operation of the second one-way clutch F2.

To achieve 6→4 shifting, the TCU disengages the fourth clutch C4 (at the sixth speed wherein the second clutch C2, the fourth clutch C4, and the second brake B2 are engaged). At this time, control of the third brake B3 is unnecessary because of the operation of the second one-way clutch F2.

To achieve 6→3 shifting, the TCU disengages both the fourth clutch C4 and the second brake B2 and engages the first clutch C1 (at the sixth speed wherein the second clutch C2, the fourth clutch C4, and the second brake B2 are engaged). At this time, control of the third brake B3 is unnecessary because of the operation of the second one-way clutch F2.

To achieve 6→3 shifting, as in the other method, after shifting into a fourth speed by disengaging the fourth clutch C4, the TCU disengages the second brake B2 and engages the first clutch C1. At this time, control of the third brake B3 is unnecessary because of the operation of the second one-way clutch F2.

As described above, according to the present invention, because it is not difficult to simultaneously control two shafts by properly using the one-way clutches disposed in the primary and secondary shift portions, it is easy to control up and down shifting and skip shifting. Additionally, because the sixth speed is obtained without changing the structure of a 5-speed automatic transmission, it is easy to install the automatic transmission in a vehicle. Also, the weight of the automatic transmission is less than that in which additional parts are installed.

Furthermore, because an automatic transmission can have appropriate gear ratios and ratios between shift ranges, optimal power performance and fuel economy characteristics can be achieved. The invention may improve shift quality by mainly using brake control rather than clutch control. Also, it may improve the durability of an automatic transmission by controlling so as to revolve the whole of the secondary shift portion at fifth and sixth speeds.

What is claimed is:

1. Shift control method of an automatic transmission, the automatic transmission comprising a primary shift portion receiving a turbine speed as an input speed of the primary shift portion, and a secondary shift portion receiving an output speed of said primary shift portion as an input speed of said secondary shift portion, said primary shift portion comprising two single pinion planetary gear sets, three clutches, two brakes, and a first one-way clutch, with each single pinion planetary gear set including a sun gear, a ring gear, and a planetary carrier; a first planetary carrier and a second ring gear being fixedly connected as an output element of said primary shift portion; a first ring gear and a second planetary carrier being fixedly connected; and a first sun gear, said second planetary carrier and a second sun gear being variably connected to an input shaft by interposition of a first clutch, a second clutch, and a third clutch, respectively; a connecting member which connects said first ring gear and said second planetary carrier being variably fixed to a housing through a first brake and said first one-way clutch, said second sun gear being variably fixed to the housing through a second brake, said secondary shift portion comprising a single pinion planetary gear set, a fourth clutch, a third brake and a second one-way clutch, said single pinion planetary gear set including a third sun gear, a third ring gear, and a third planetary carrier, said third ring gear being an input element of said secondary shift portion, said third planetary carrier being an output element of said secondary shift portion, said third sun gear and said third planetary carrier being connected by interposition of said fourth clutch, said third sun gear being connected to the housing through said third brake and said second one-way clutch, said shift control method comprising:
controlling the automatic transmission at a first shift-speed such that the primary shift portion has a first predetermined speed ratio and the secondary shift portion has a predetermined reduction ratio;
controlling the automatic transmission at a second shift-speed such that the primary shift portion has a second predetermined speed ratio and the secondary shift portion has said predetermined reduction ratio;
controlling the automatic transmission at a third shift-speed such that the primary shift portion has a speed ratio of "1" and the secondary shift portion has said predetermined reduction ratio;
controlling the automatic transmission at a fourth shift-speed such that the primary shift portion has a third predetermined speed ratio and the secondary shift portion has said predetermined reduction ratio;
controlling the automatic transmission at a fifth shift-speed such that the primary shift portion has a speed ratio of "1" and the secondary shift portion has a speed ratio of "1"; and
controlling the automatic transmission at a sixth shift-speed such that the primary shift portion has said third predetermined speed ratio and the secondary shift portion has a speed ratio of "1".

2. The method of claim 1, wherein said controlling the automatic transmission at a first shift-speed is engaging said first clutch and said first brake.

3. The method of claim 1, wherein said controlling the automatic transmission at a second shift-speed is engaging said first clutch and said second brake.

4. The method of claim 1, wherein said controlling the automatic transmission at a third shift-speed is engaging said first clutch, said second clutch, and said third brake.

5. The method of claim 1, wherein said controlling the automatic transmission at a fourth shift-speed is engaging said second clutch and said second brake.

6. The method of claim 1, wherein said controlling the automatic transmission at a fifth shift-speed is engaging said first, second, and fourth clutches.

7. The method of claim 1, wherein said controlling the automatic transmission at a sixth shift-speed is engaging said second clutch, said fourth clutch, and said second brake.

8. The method of claim 1 further comprising disengaging said first brake and engaging said second brake at 1→2 shifting.

9. The method of claim 1 further comprising disengaging said second brake and engaging said second clutch and said third brake at 2→3 shifting.

10. The method of claim 1 further comprising disengaging said first clutch and engaging said second brake at 3→4 shifting.

11. The method of claim 1 further comprising disengaging said second and third brakes and engaging said first and fourth clutches at 4→5 shifting.

12. The method of claim 1 further comprising disengaging said first clutch and engaging said second brake at 5→6 shifting.

13. The method of claim 1 further comprising disengaging said second clutch and said third brake at 3→1 shifting.

14. The method of claim 1 further comprising disengaging said second clutch and engaging said first clutch at 4→2 shifting.

15. The method of claim 1 further comprising disengaging said fourth clutch at 5→3 shifting.

16. The method of claim 1 further comprising disengaging said second and fourth clutches and engaging said second brake at 5→2 shifting.

17. The method of claim 1 further comprising disengaging said fourth clutch at 6→4 shifting.

18. The method of claim 1 further comprising disengaging said fourth clutch and said second brake and engaging said first clutch at 6→3 shifting.

19. The method of claim 1 further comprising disengaging said second brake and engaging said first clutch after shifting into a fourth shift-speed by disengaging said fourth clutch, at 6→3 shifting.

20. A shift control method of an automatic transmission, the automatic transmission comprising a primary shift portion receiving a turbine speed as an input speed of the primary shift portion, and a secondary shift portion receiving an output speed of said primary shift portion as an input speed of said secondary shift portion, said primary shift portion comprising two single pinion planetary gear sets, three clutches, two brakes, and a first one-way clutch, with each single pinion planetary gear set including a sun gear, a ring gear, and a planetary carrier; a first planetary carrier and a second ring gear being fixedly connected as an output element of said primary shift portion; a first ring gear and a second planetary carrier being fixedly connected; and a first sun gear, said second planetary carrier and a second sun gear being variably connected to an input shaft by interposition of a first clutch, a second clutch, and a third clutch, respectively; a connecting member which connects said first ring gear and said second planetary carrier being variably fixed to a housing through a first brake and said first one-way clutch, said second sun gear being variably fixed to the housing through a second brake, said secondary shift portion comprising a single pinion planetary gear set, a fourth clutch, a third brake and a second one-way clutch, said single pinion planetary gear set including a third sun gear, a third ring gear, and a third planetary carrier, said third ring gear being an input element of said secondary shift portion, said third planetary carrier being an output element of said secondary shift portion, said third sun gear and said third planetary carrier being connected by interposition of said fourth clutch, said third sun gear being connected to the housing through said third brake and said second one-way clutch, said shift control method comprising:
   disengaging said first brake and engaging said second brake when 1→2 shifting;
   disengaging said second brake and engaging said second clutch and said third brake when 2→3 shifting;
   disengaging said first clutch and engaging said second brake when 3→4 shifting;
   disengaging said second and third brakes and engaging said first and fourth clutches when 4→5 shifting;
   disengaging said first clutch and engaging said second brake when 5→6 shifting;
   disengaging said second clutch and said third brake when 3→1 shifting;
   disengaging said second clutch and engaging said first clutch when 4→2 shifting;
   disengaging said fourth clutch when 5→3 shifting;
   disengaging said second and fourth clutches and engaging said second brake when 5→2 shifting;
   disengaging said fourth clutch when 6→4 shifting;
   disengaging said fourth clutch and said second brake and engaging said first clutch when 6→3 shifting; and
   disengaging said second brake and engaging said first clutch after shifting into a fourth shift-speed by disengaging said fourth clutch, when 6→3 shifting.

* * * * *